US011985380B2

(12) United States Patent
Suzuki et al.

(10) Patent No.: US 11,985,380 B2
(45) Date of Patent: May 14, 2024

(54) VIDEO OUTPUT METHOD AND VIDEO OUTPUT APPARATUS

(71) Applicant: YAMAHA CORPORATION, Hamamatsu (JP)

(72) Inventors: Masato Suzuki, Hamamatsu (JP); Shintaro Noguchi, Irvine, CA (US)

(73) Assignee: YAMAHA CORPORATION, Hamamatsu (JP)

( * ) Notice: Subject to any disclaimer, the term of this patent is extended or adjusted under 35 U.S.C. 154(b) by 106 days.

(21) Appl. No.: 17/685,537

(22) Filed: Mar. 3, 2022

(65) Prior Publication Data

US 2022/0286733 A1    Sep. 8, 2022

(30) Foreign Application Priority Data

Mar. 3, 2021    (JP) .................................. 2021-033149

(51) Int. Cl.
*H04N 21/439* (2011.01)
*H04N 21/4223* (2011.01)
*H04N 21/431* (2011.01)
*H04N 21/44* (2011.01)

(52) U.S. Cl.
CPC ..... *H04N 21/4394* (2013.01); *H04N 21/4223* (2013.01); *H04N 21/4316* (2013.01); *H04N 21/44008* (2013.01)

(58) Field of Classification Search
None
See application file for complete search history.

(56) References Cited

U.S. PATENT DOCUMENTS

| 6,590,602 B1* | 7/2003 | Fernandez ............. H04N 5/445 |
| | | 348/E7.071 |
| 9,445,048 B1* | 9/2016 | Nariyawala ......... H04L 65/1083 |
| 9,456,235 B1* | 9/2016 | Greenfield ......... H04N 21/6131 |
| 11,240,469 B1* | 2/2022 | Schoenborn ........... H04R 1/403 |
| 2002/0167586 A1* | 11/2002 | Liu ................ H04N 21/234309 |
| | | 348/14.12 |
| 2003/0220143 A1 | 11/2003 | Shteyn et al. |
| 2009/0293079 A1* | 11/2009 | McKee ............. H04N 21/4788 |
| | | 725/10 |
| 2010/0014840 A1 | 1/2010 | Nagai |

(Continued)

FOREIGN PATENT DOCUMENTS

| JP | 2010016482 A | 1/2010 |
| JP | 2013021466 A | 1/2013 |

(Continued)

OTHER PUBLICATIONS

International Search Report issued in Intl. Appln. No. PCT/IB2022/053556 mailed Jul. 26, 2022.

(Continued)

*Primary Examiner* — Alexander Q Huerta
(74) *Attorney, Agent, or Firm* — ROSSI, KIMMS & McDOWELL LLP

(57) ABSTRACT

A video output method receives an operation from each of a plurality of users, generates a performance image and a performance sound based on the received operation, receives first video data, synthesizes the first video data and the performance image to generate output video data, and outputs the output video data and the performance sound.

14 Claims, 13 Drawing Sheets

(56) References Cited

U.S. PATENT DOCUMENTS

| | | | |
|---|---|---|---|
| 2011/0085018 A1* | 4/2011 | Culbertson | H04N 7/15 348/E7.083 |
| 2012/0320143 A1* | 12/2012 | Chu | H04N 7/15 348/E7.083 |
| 2013/0014139 A1 | 1/2013 | Kawakami | |
| 2014/0192141 A1* | 7/2014 | Begeja | H04N 7/147 348/14.08 |
| 2015/0294656 A1* | 10/2015 | Hanuschak | G06F 3/167 345/173 |
| 2016/0004499 A1* | 1/2016 | Kim | H04R 29/008 715/716 |
| 2016/0093108 A1* | 3/2016 | Mao | G02B 27/017 345/633 |
| 2016/0226926 A1* | 8/2016 | Singh | G06F 3/00 |
| 2018/0095708 A1 | 4/2018 | Black et al. | |
| 2019/0104235 A1* | 4/2019 | Sarkar | H04N 21/47 |
| 2020/0359108 A1* | 11/2020 | Lee | H04H 60/33 |
| 2021/0337245 A1* | 10/2021 | Meitus | H04N 21/439 |
| 2023/0199231 A1* | 6/2023 | Fredette | H04N 21/2187 725/105 |

FOREIGN PATENT DOCUMENTS

| | | |
|---|---|---|
| JP | 2019092146 A | 6/2019 |
| WO | 03099401 A2 | 12/2003 |
| WO | 2018064005 A1 | 4/2018 |

OTHER PUBLICATIONS

Written Opinion issued in Intl. Appln. No. PCT/IB2022/053556 mailed Jul. 26, 2022.

* cited by examiner

VIDEO OUTPUT METHOD AND VIDEO OUTPUT APPARATUS

CROSS REFERENCE TO RELATED APPLICATIONS

This Nonprovisional application claims priority under 35 U.S.C. § 119(a) on Patent Application No. 2021-033149 filed in Japan on Mar. 3, 2021, the entire contents of which are hereby incorporated by reference.

BACKGROUND

1. Technical Field

One exemplary embodiment of the invention relates to a video output method and a video output apparatus.

2. Background Information

Unexamined Japanese Patent Publication No. 2013-21466 discloses a system that displays video images reflecting a motion of a viewer outside a hall for live performance or the like on a display being installed in the hall. The system of Unexamined Japanese Patent Publication No. 2013-21466 simultaneously transmits video images of the live performance or the like in the hall to a terminal of the viewer outside the hall and displays video images according to the motion of the viewer outside the hall on the display.

The distribution server of Unexamined Japanese Patent Publication No. 2019-92146 is provided with a receiver, a determinator, a synthesizer, and a distributor. The receiver receives live-streaming video data from a distributor terminal. The determinator determines whether performance condition is satisfied or not. When the performance condition is satisfied, the synthesizer synthesizes performance data with video data to generate composite video data. The distributor distributes the composite video data to a distributor terminal and a spectator terminal.

Unexamined Japanese Patent Publication No. 2010-16482 discloses an upsurge-degree obtaining unit that obtains a degree of upsurge of a viewer and extracts highlights of program content based on the degree of upsurge.

SUMMARY

One exemplary embodiment of the invention aims to provide a video output method and a video output apparatus that allow a user to feel a sense of unity with an event.

A video output method in accordance with one exemplary embodiment of the present invention receives an operation from each of a plurality of users, generates a performance image and a performance sound based on the received operation, receives first video data, synthesizes the first video data and the performance image to generate output video data, and outputs the output video data and the performance sound.

Further, a video output method in accordance with another exemplary embodiment of the present invention receives an operation from each of a plurality of users, receives first video data obtained by photographing a device that performs a performance based on the received operation, and outputs output video data based on the first video data.

According to one exemplary embodiment of the present invention, the user can obtain a sense of unity with an event.

DETAILED DESCRIPTION

First Exemplary Embodiment

Figure 1:
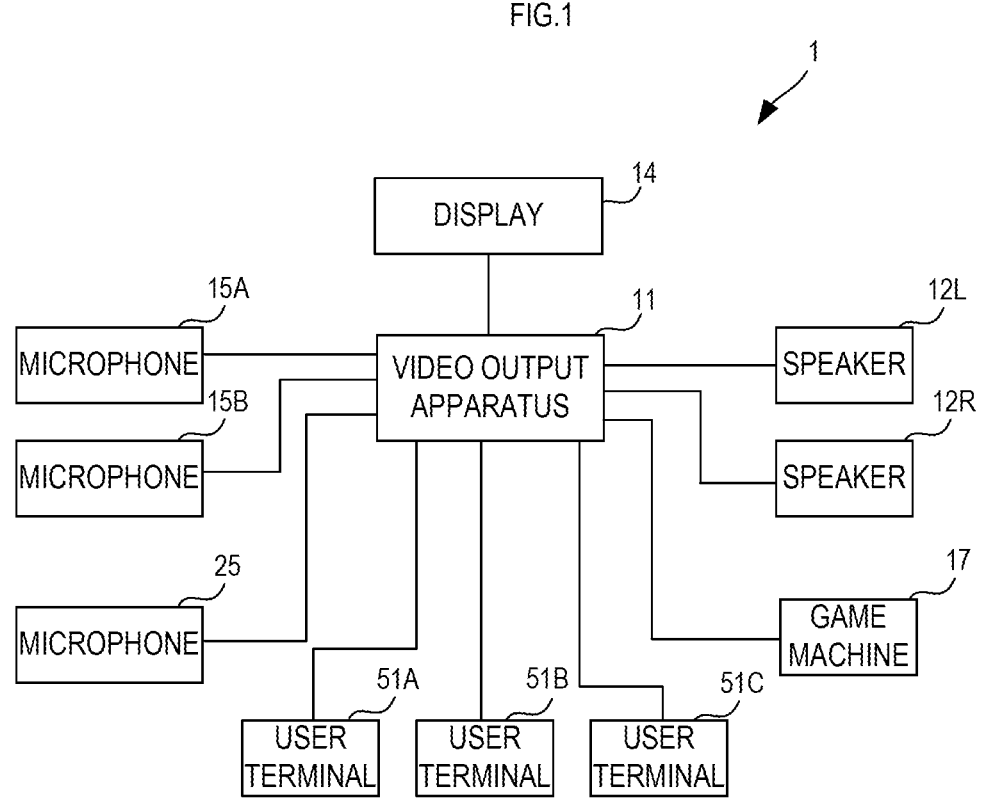
FIG. 1 is a block diagram showing a configuration of a video output system 1.

FIG. 1 is a block diagram showing a configuration of a video output system 1. The video output system 1 is provided with a video output apparatus 11, a speaker 12L, a speaker 12R, a display 14, a microphone 15A, a microphone 15B, a microphone 25, a game machine 17, a user terminal 51A, a user terminal 51B, and a user terminal 51C. Note that, the number of microphones, the number of speakers, the number of user terminals, and the like are not limited to the number of examples shown in the present exemplary embodiment.

Figure 2:
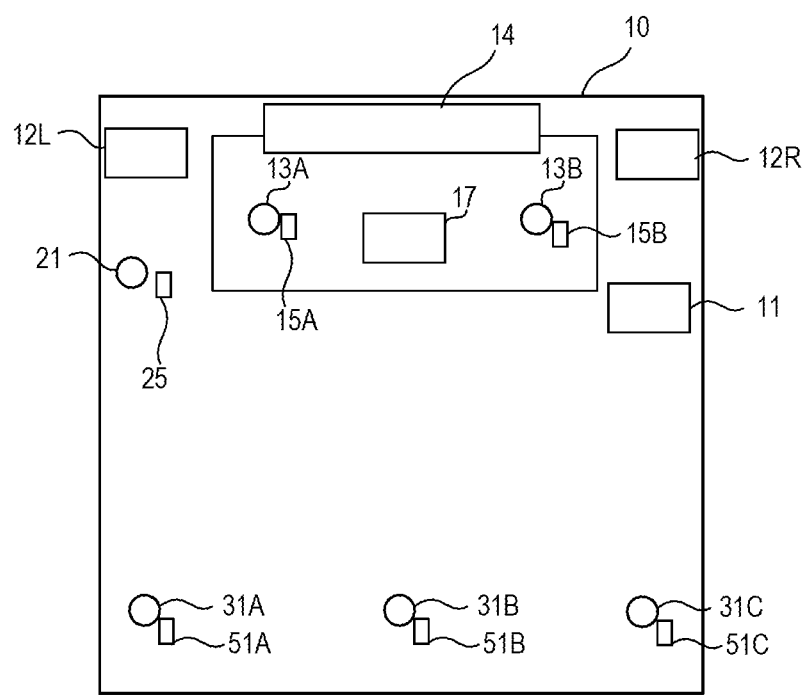
FIG. 2 is a schematic plan view of a hall 10.
Figure 3:
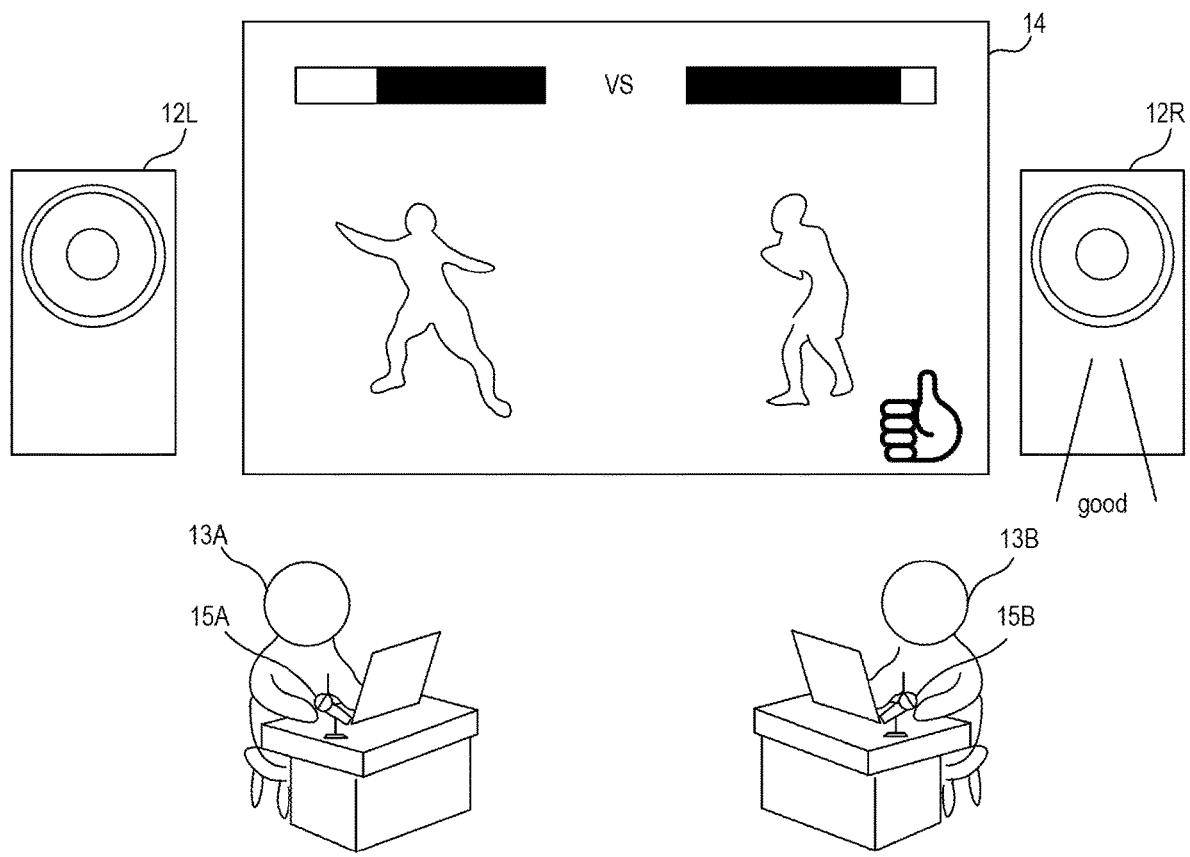
FIG. 3 is a schematic view showing a state of an event.

FIG. 2 is a schematic plan view of a hall 10. In this example, the hall 10 is a hall for performing an event. FIG. 3 is a schematic view showing a state of an event. The display 14 is installed in the front of the hall 10. The speaker 12L is disposed on a left-hand side of the display 14, and the speaker 12R is disposed on a right-hand side of the display 14.

A first performer 13A and a second performer 13B perform a performance in front of the display 14. The event, shown in this example, is a game event, and the first performer 13A and the second performer 13B perform game play as an example of the performance. The content of the game play is displayed on the display 14.

The microphone 15A captures a voice of the first performer 13A. The microphone 15B captures a voice of the second performer 13B. Further, the microphone 25 captures a voice of an emcee 21. The emcee 21 performs live commentary or the like, for example.

The speaker 12L and the speaker 12R output a sound of the game, a voice of the first performer 13A, a voice of the second performer 13B, and a voice of the emcee 21.

By viewing video images displayed on the display 14 and listening to sounds outputted from the speaker 12L and the speaker 12R, the user 31A, the user 31B, and the user 31C in the hall 10 enjoy an event.

Figure 4:
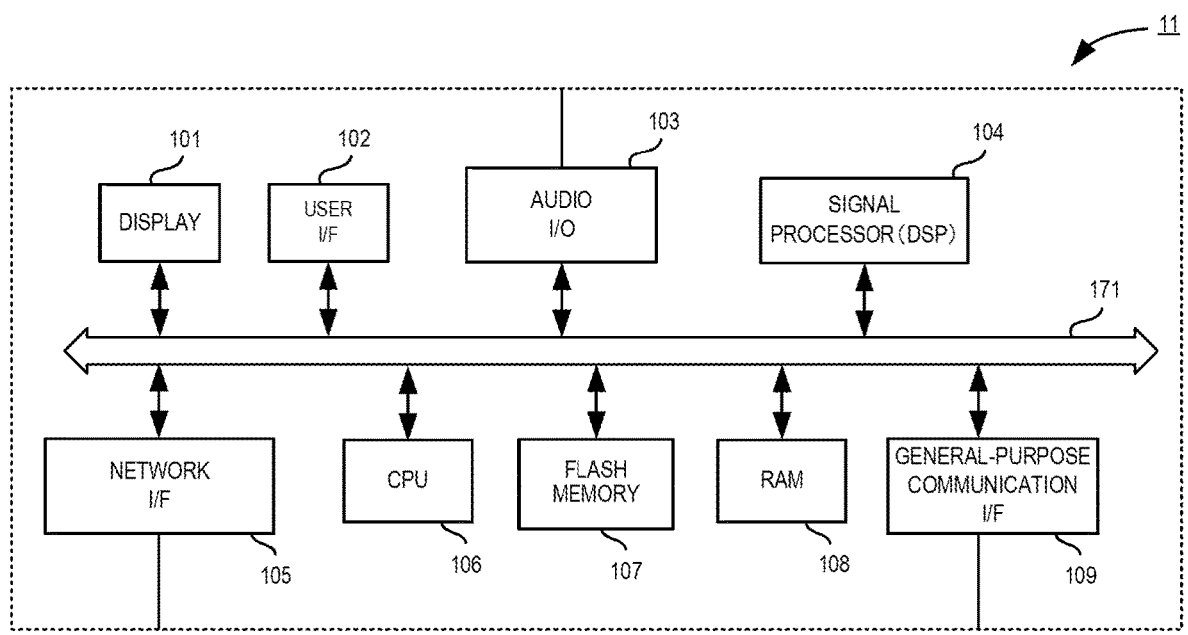
FIG. 4 is a block diagram showing a configuration of a video output apparatus 11.

FIG. 4 is a block diagram showing a configuration of the video output apparatus 11. As shown in FIG. 1, the video output apparatus 11 is connected to the speaker 12L, the speaker 12R, the display 14, the microphone 15A, the microphone 15B, the microphone 25, the game machine 17, the user terminal 51A, the user terminal 51B, and the user terminal 51C.

The video output apparatus 11 is constituted by an information processor such as a general-purpose personal computer, for example. The video output apparatus 11 is provided with a display 101, a user I/F 102, an audio I/O (Input/Output) 103, a signal processor (DSP) 104, a network I/F 105, a CPU 106, a flash memory 107, a RAM 108, and a general-purpose communication I/F 109.

The CPU 106 is a controller that controls an operation of the video output apparatus 11. The CPU 106 reads out a predetermined program stored in the flash memory 107, which serves a storage medium, to the RAM 108 to achieve various kinds of operations. By executing the programs, the CPU 106 functionally configures a user operation receptor, a video data receptor, a video data generator, a performance data generator, and an outputter, all of which are included in the present disclosure.

Note that, the program read by the CPU 106 is not required to be stored in the flash memory 107 of the video output apparatus 11. For instance, the program may be stored in a storage medium of an external device such as a server. In this case, the CPU 106 may read out the program to the RAM 108 from the server and execute it, as necessary.

The audio I/O 103 is connected to the microphone 15A, the microphone 15B, the microphone 25, the speaker 12L, and the speaker 12R through an audio cable.

The network I/F 105 is connected to the user terminal 51A, the user terminal 51B, and the user terminal 51C wiredly or wirelessly. Note that, the microphone 15A, the microphone 15B, the microphone 25, the speaker 12L, and the speaker 12R may be connected through the network I/F 105.

The general-purpose communication I/F 109 is a communication I/F in compliance with the standard of HDMI (registered trademark), a USB, or the like, for example. The general-purpose communication I/F 109 is connected to the game machine 17 and the display 14. Note that, the microphone 15A, the microphone 15B, the microphone 25, the speaker 12L, and the speaker 12R may be connected through the general-purpose communication I/F 109.

The signal processor 104 is constituted by a DSP for performing sound signal processing and image signal processing. The signal processor 104 mixes a sound signal that has been received from the microphone through the audio I/O 103 and a sound of the game that has been received through the general-purpose communication I/F 109. Further, the signal processor 104 performs processing for synthesizing a performance sound. The performance sound is described later in detail. The signal processor 104 outputs the sound signal, which is subjected to the signal processing, to the speaker 12L and the speaker 12R through the audio I/O 103. Thus, the speaker 12L and the speaker 12R reproduce a sound of the game, a vice of the first performer 13A, a voice of the second performer 13B, and a voice of the emcee 21. Note that, in the present disclosure, it is not essential to reproduce a voice of the first performer 13A, a voice of the second performer 13B, and a voice of the emcee 21.

Further, the signal processor 104 receives a video signal related to a game screen from the game machine 17 through the general-purpose communication I/F 109. The signal processor 104 synthesizes a performance image with the received video signal to generate an output video signal. The video signal inputted from the game machine 17 is an example of a first video data of the present disclosure. The performance image is described later in detail. The signal processor 104 outputs the video signal, which is subjected to the signal processing, to the display 14 through the general-purpose communication I/F 109.

The user terminal 51A, the user terminal 51B, and the user terminal 51C each are a corresponding one of information processing terminals (e.g., a smart phone, a personal computer, and the like.) owned by the user 31A, the user 31B, and the user 31C.

Figure 5:
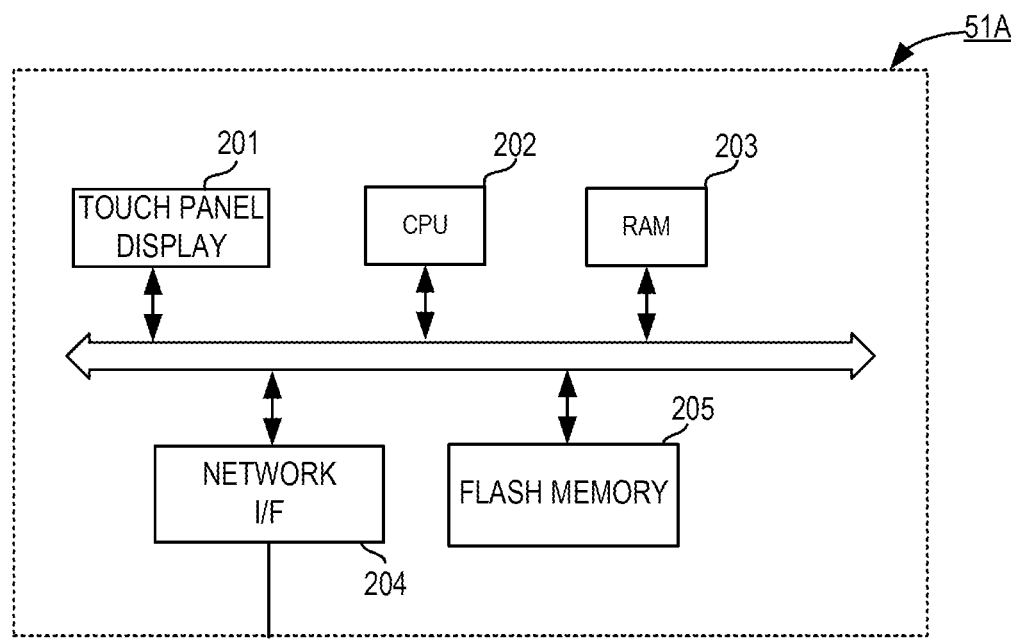
FIG. 5 is a block diagram showing a configuration of a user terminal 51A.

FIG. 5 is a block diagram showing a configuration of the user terminal 51A. Note that, the user terminal 51A, the user terminal 51B, and the user terminal 51C each have the same main configuration and achieve the same function. Therefore, FIG. 5 shows a configuration of the user terminal 51A, representatively.

The user terminal 51A is provided with a touch-panel display 201, a CPU 202, a RAM 203, a network I/F 204, and a flash memory 205.

The flash memory 205, which serves as a storage medium, stores an application program related to the video output system 1 of the present exemplary embodiment. The CPU 202 reads out the application program to the RAM 203 to achieve a predetermined function. Note that, the program read by the CPU 202 is also not required to be stored in the flash memory 205 of the user terminal 51A. For instance, the program may be stored in a storage medium of an external device such as a server. In this case, the CPU 202 may read out the program to the RAM 203 from the server and execute it, as necessary.

The CPU 202 receives a user's touch operation through the touch-panel display 201. When receiving the user's touch operation, the CPU 202 transmits user operation information to the video output apparatus 11 through the network I/F 204. Note that, the CPU 202 may also receive information related to a touch position on the touch-panel display 201. The user operation information may include the information related to a touch position.

Figure 6:
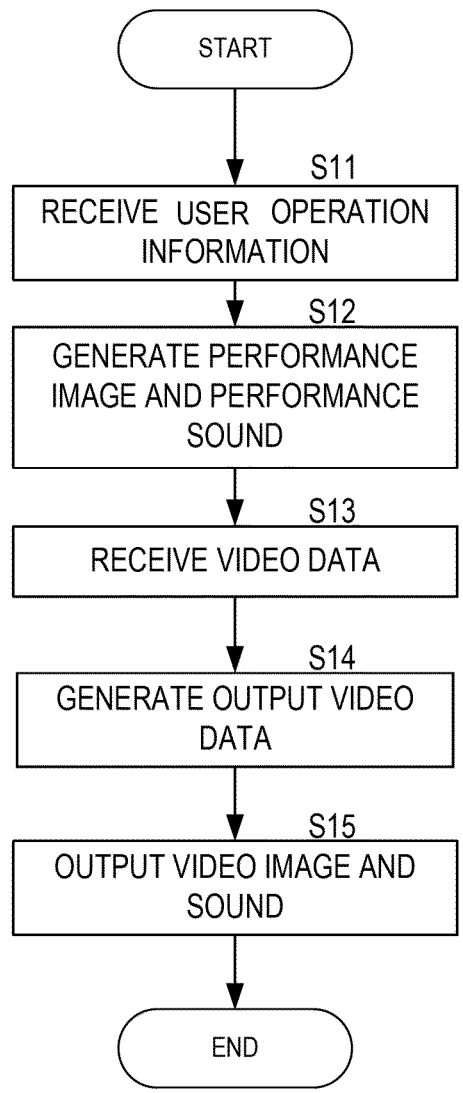
FIG. 6 is a flowchart showing an operation of the video output apparatus 11.

FIG. 6 is a flowchart showing an operation of the CPU 106 of the video output apparatus 11. Through the network I/F 105, the CPU 106 receives the user operation information related to the user 31A, the user 31B, and the user 31C from the user terminal 51A, the user terminal 51B, and the user terminal 51C, respectively (S11).

The CPU 106 generates a performance image and a performance sound based on the received user operation information (S12). The performance image is a thumbs-up image as shown in FIG. 3, for example. The performance image may be an effect image such as partial modification in the game screen, or may be character information such as "good." The performance sound is a sound such as encouragement, applause, calls, cheers, or buzz, for example. Further, the performance sound may be a voice of each user that is captured by a microphone (not shown) of the user terminal 51A. Further, the performance sound may be a mechanical voice that reads aloud characters such as "good", or may be a recording of a voice that a person reads aloud.

The CPU 106 receives the video signal (the first video data) of the game screen (S13), synthesizes the performance image with the video data to generate output video data (S14). The CPU 106 outputs the output video data and the performance sound (S15).

Thus, the video output apparatus 11 reproduces the performance image and the performance sound according to the user's operation. For instance, when the user 31A operates the touch-panel display 201 of the user terminal MA, the performance image, i.e., a thumbs-up image is displayed on the display 14 and the performance sound is reproduced from the speaker 12L or the speaker 12R. Thus, the user 31A can get a feel of participating in an event because the performance image and the performance sound are reproduced according to the user's own operation, thereby making it possible to obtain a sense of unity with the event.

Figure 7:
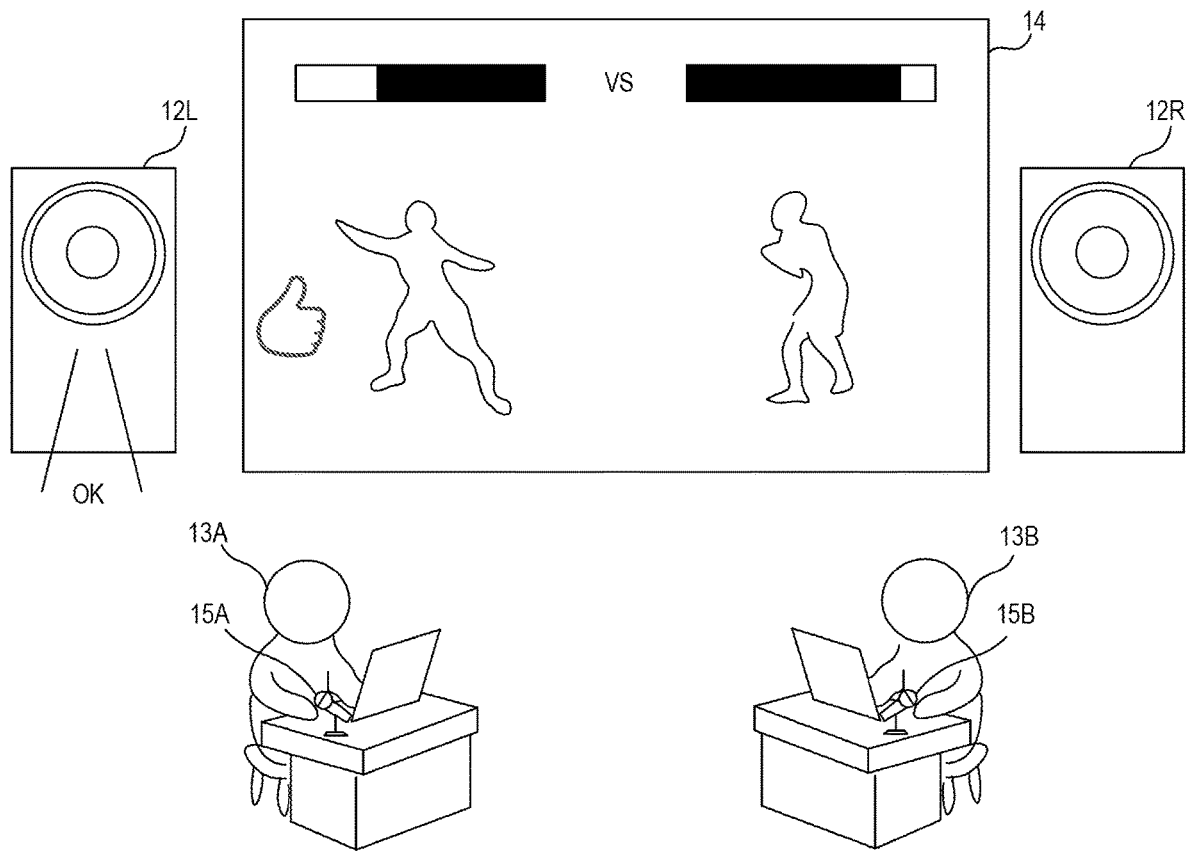
FIG. 7 is a schematic view showing a state of an event.

Note that, the video output apparatus 11 may change a display position of the performance image according to a touch position on the touch-panel display 201. In this case, the user terminal 51A transmits information indicative of the touch position to the video output apparatus 11. For instance, when a user touches a right-hand side of the touch-panel display 201, the video output apparatus 11 synthesizes the performance image in a right-hand side of a video image displayed on the display 14. When a user touches a left-hand side of the touch-panel display 201, the video output apparatus 11 synthesizes the performance image in a left-hand side of the video image displayed on the display 14, as shown in FIG. 7.

Further, when a user touches a lower side of the touch-panel display 201, the video output apparatus 11 synthesizes the performance image in a lower side of the video image displayed on the display 14. When a user touches an upper side of the touch-panel display 201, the video output apparatus 11 synthesizes the performance image in an upper side of the video image displayed on the display 14.

Further, the video output apparatus 11 may change sound quality of the performance sound according to a touch position on the touch-panel display 201. The sound quality includes pitch and panning. For instance, when a user touches the right-hand side of the touch-panel display 201, the video output apparatus 11 makes a level of the sound signal to be outputted to the speaker 12R higher than a level of the sound signal to be outputted to the speaker 12L such that the performance sound is localized on the right-hand side. When a user touches the left-hand side of the touch-panel display 201, video output apparatus 11 makes a level of the sound signal to be outputted to the speaker 12L higher than a level of the sound signal to be outputted to the speaker 12R such that the performance sound is localized on the left-hand side. In this way, the video output apparatus 11 performs panning processing according to the touch position to change localization of the performance sound. Further, for instance, when a user touches the lower side of the touch-panel display 201, the video output apparatus 11 decreases pitch such that the performance sound becomes lower. When a user touches the upper side of the touch-panel display 201, the video output apparatus 11 increases pitch such that the performance sound becomes higher.

Thus, by changing the touch position, a user can reproduce the performance image and the performance sound at a desirable position with desired sound quality. For instance, if supporting and encouraging the second performer 13B, a user will touch the right-hand side of the touch-panel display 201, so that the performance image and the performance sound are reproduced near the second performer 13B. Consequently, a user can display the performance image near a user's favorite performer according to a user's own operation. Further, a user can reproduce the performance sound near a user's favorite performer according to a user's own operation. Thus, the user can obtain a sense of unity with an event more.

The performance image and the performance sound may differ for each user. In other words, the performance image and the performance sound may be constituted by performance information including a performance image and a performance sound that are generated corresponding to an operation from each of a plurality of users. For instance, the video output apparatus 11 may display different performance images between a case where the operation is received through the user terminal 51A and a case where the operation is received through the user terminal 51B. Further, the video output apparatus 11 may reproduce different performance sounds between the case where the operation is received through the user terminal 51A and the case where the operation is received through the user terminal 51B.

Second Exemplary Embodiment

Figure 8:
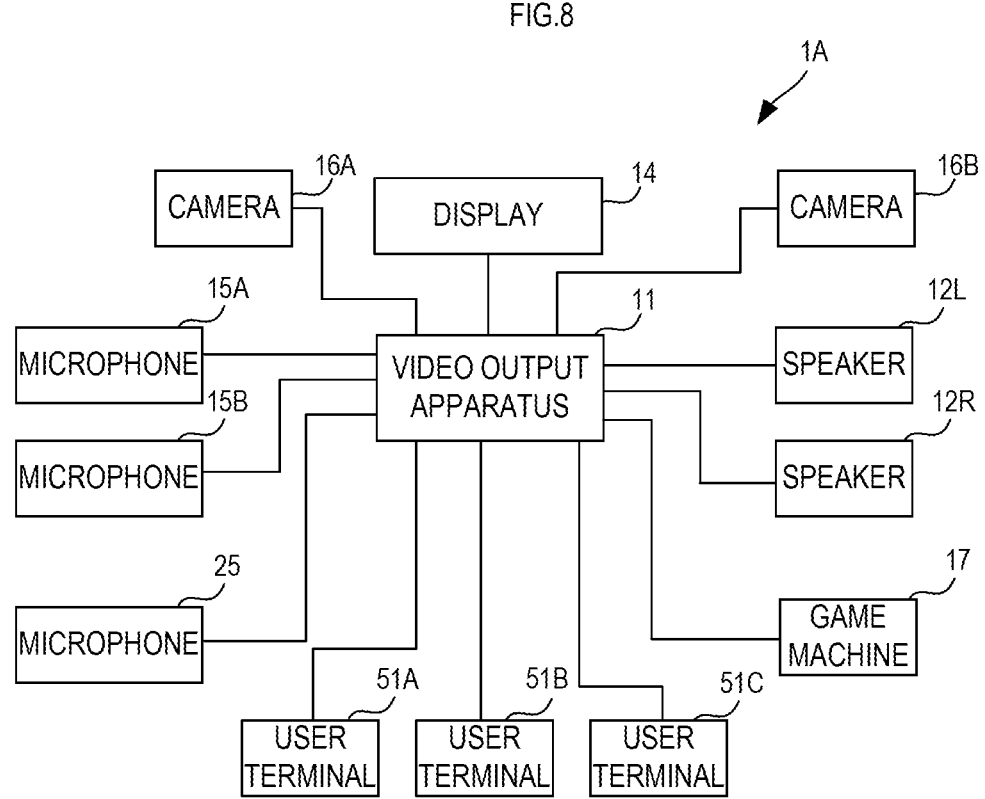
FIG. 8 is a block diagram showing a configuration of a video output system 1A in accordance with a second exemplary embodiment.
Figure 9:
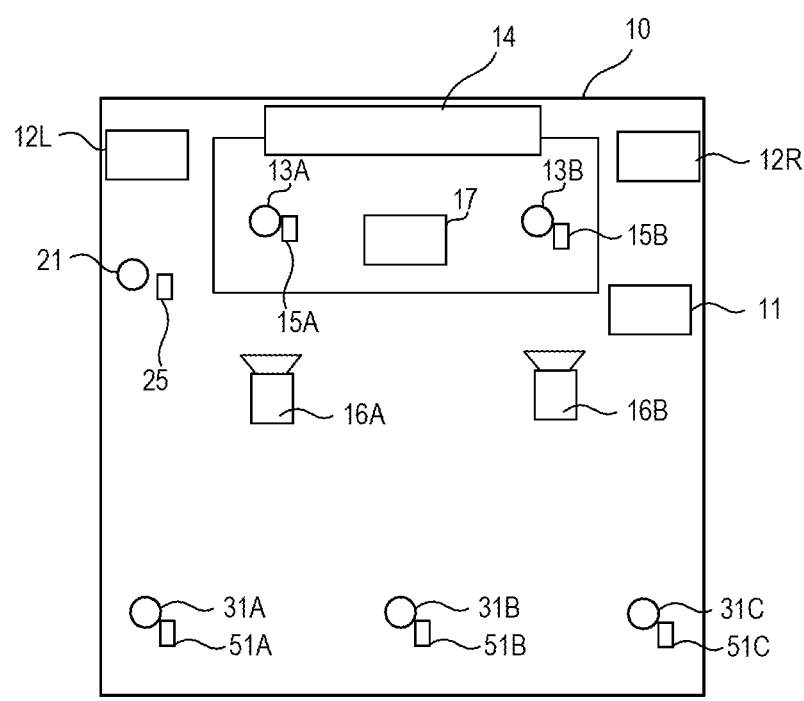
FIG. 9 is a schematic plan view of the hall 10.
Figure 10:
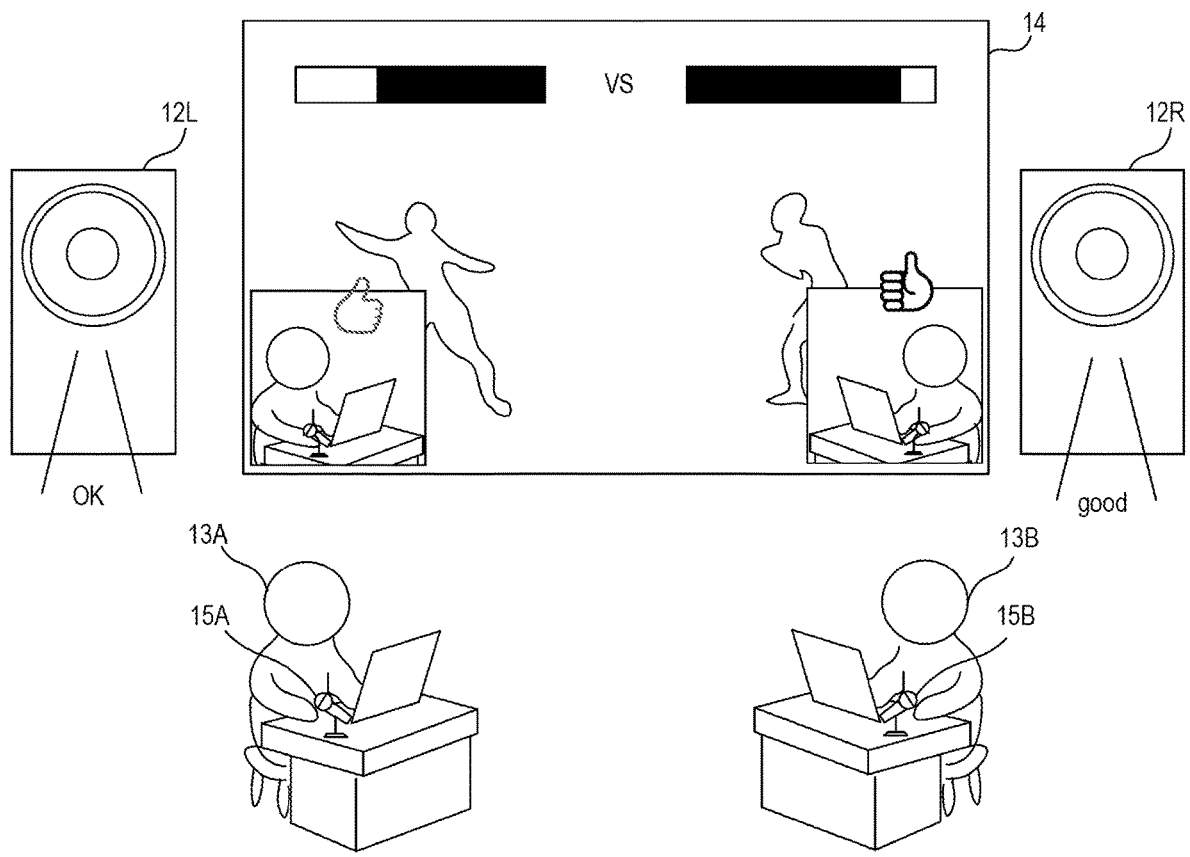
FIG. 10 is a schematic view showing a state of an event.

Next, FIG. 8 is a block diagram showing a configure of a video output system 1A in accordance with a second exemplary embodiment. FIG. 9 is a schematic plan view of the hall 10. FIG. 10 is a schematic view showing a state of an event. For the video output system 1, the video output system 1A is further provided with a camera 16A and a camera 16B. The other configuration is the same as in the video output system 1.

The camera 16A photographs the first performer 13A and the microphone 15A. The camera 16B photographs the second performer 13B and the microphone 15B. The video output apparatus 11 further receives a second video data including a video image of the first performer 13A photographed by the camera 16A, and a third video data including a video image of the second performer 13B photographed by the camera 16B. The video output apparatus 11 synthesizes the video data of the first performer 13A (second video data) and the video data of the second performer 13B (third video data) with a game image (first video data) to generate an output video data. Thus, as shown in FIG. 10, the video image of the first performer 13A and the video image of the second performer 13B are synthesized with the game image, and then displayed on the display 14. In the example of FIG. 10, the video output apparatus 11 synthesizes the video image of the first performer 13A in a left-hand side of the screen, and synthesizes the video image of the second performer 13B in a right-hand side of the screen.

When receiving user operation information from each user, the video output apparatus 11 generates a performance image and a performance sound based on the received user operation information. At this time, the video output apparatus 11 associates the performance image and the performance sound (performance information), which are generated corresponding to the operation from each of a plurality of users, with the first performer 13A or the second performer 13B.

For instance, when the user 31A touches the right-hand side of the touch-panel display 201 in the user terminal MA, the video output apparatus 11 associates the performance information with the second performer 13B. The video output apparatus 11 synthesizes the performance image, which is generated according to the user's operation in the user terminal MA, near the video image of the second performer 13B. Further, the video output apparatus 11 makes a level of the sound signal to be outputted to the speaker 12R higher than a level of the sound signal to be outputted to the speaker 12L such that the performance sound, which is generated according to the user's operation in the user terminal MA, is localized on the right-hand side. For instance, as shown in FIG. 10, the video output apparatus 11 displays a thumbs-up image, which corresponds to the operation in the user terminal 51A, near the video image of the second performer 13B. Further, the video output apparatus 11 reproduces the sound such as "good," which corresponds to the operation in the user terminal 51A, near the video image of the second performer 13B.

Note that, by using the user terminal, each user may specify a performer to be associated with the user himself/herself, in advance. In this case, even if a user touches any position of the touch-panel display, the performance image and the performance sound are reproduced near the performer specified by the user. For instance, when the user 31B specifies to be associated with the first performer 13A using the user terminal 51B, the video output apparatus 11 synthesizes the performance image, which is generated according to the user's operation in the user terminal 51B, near the video image of the first performer 13A. Further, the video output apparatus 11 makes a level of the sound signal to be outputted to the speaker 12L higher than a level of the sound signal to be outputted to the speaker 12L such that the performance sound, which is generated according to the user's operation in the user terminal 51B, is localized on the left-hand side. In this case, even if the user 31B touches any position of the touch-panel display 201 in the user terminal 51B, the video output apparatus 11 displays a thumbs-up image, which corresponds to the operation in the user terminal 51B, near the video image of the first performer 13A. Further, the video output apparatus 11 reproduces a sound such as "OK," which corresponds to the operation in the user terminal 51B, near the video image of the first performer 13A.

In this way, the video output system 1A associates each user's operation with each performer to reproduce the performance image and the performance sound. Thus, a user can display the performance image near a user's favorite performer. Further, a user can reproduce the performance sound near a user's favorite performer. Consequently, a user can obtain a sense of unity with an event more.

Note that, the camera may photograph an image including content of game play currently being displayed on the display 14. In this case, the number of cameras may be one. Even if only one camera is provided, the video output apparatus 11 can obtain video data (first video data) including a plurality of performers and the game image. In this case, the first video data are video data obtained by photographing using the camera, and the video data include video data of the game screen. The first video data include video data obtained by photographing the performers.

Third Exemplary Embodiment

Figure 11:
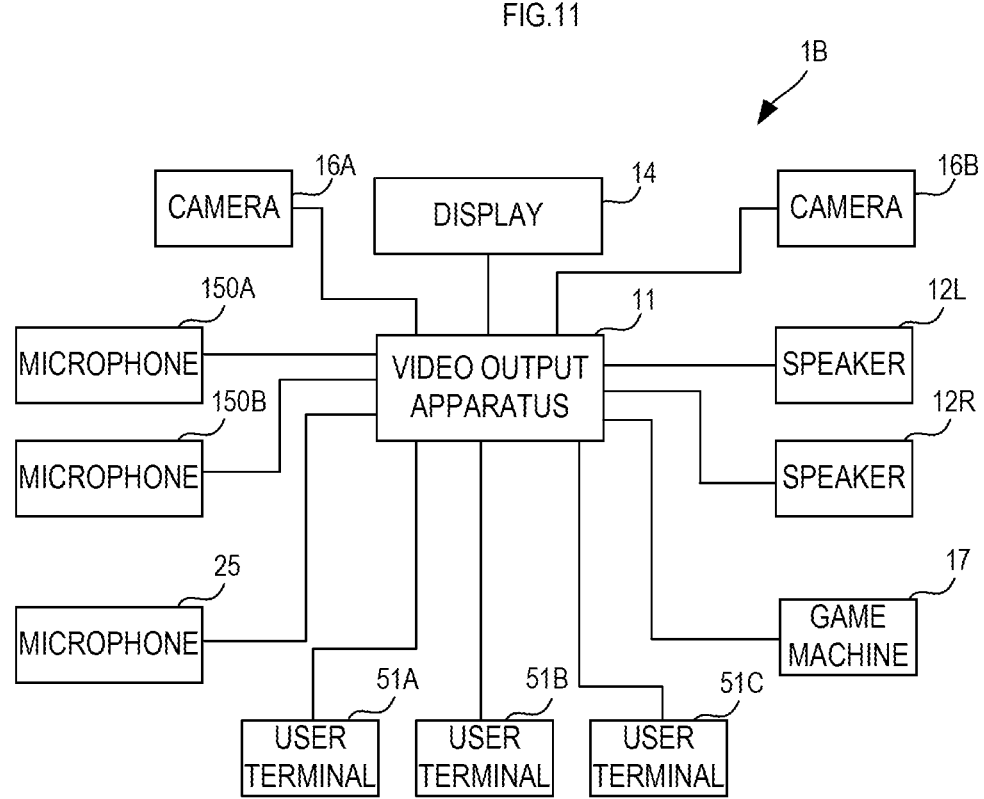
FIG. 11 is a block diagram showing a configuration of a video output system 1B in accordance with a third exemplary embodiment.
Figure 12:
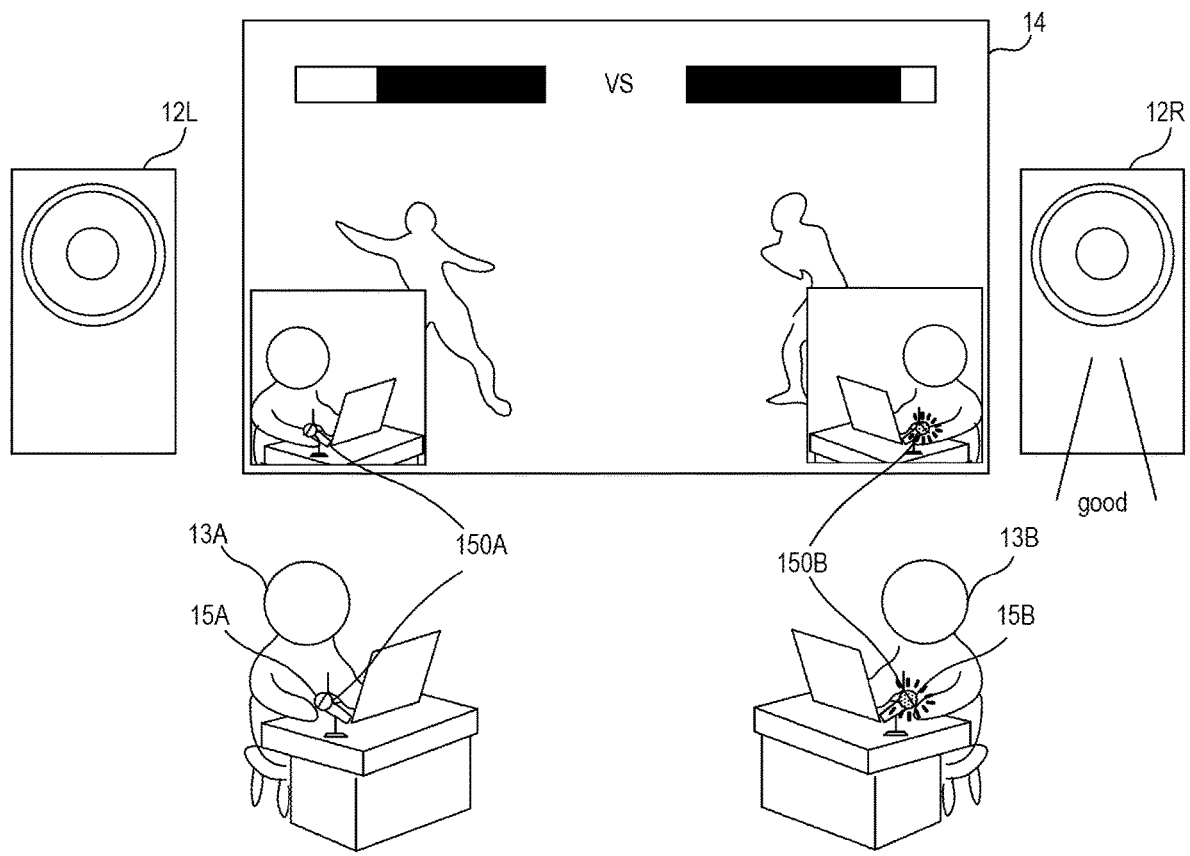
FIG. 12 is a schematic view showing a state of an event.

Next, FIG. 11 is a block diagram showing a configuration of a video output system 1B in accordance with a third exemplary embodiment. FIG. 12 is a schematic view showing a state of an event. For the video output system 1A, the video output system 1B is further provided with a microphone 150A and a microphone 150B, instead of the microphone 15A and the microphone 15B. The other configured is the same as in the video output system 1A of the second exemplary embodiment.

The microphone 150A and the microphone 150B each are further provided with an indicator such as an LED, in addition to the function of the microphone 15A and the microphone 15B. When receiving user operation information from each user, the video output apparatus 11 controls lighting of LEDs of the microphone 150A and the microphone 150B based on the received user operation information. In other words, when receiving the user operation information from each user, the video output apparatus 11 turns on an LED of the microphone 150A or the microphone 150B.

For instance, when a user touches the right-hand side of the touch-panel display 201, the video output apparatus 11 turns on the LED of the microphone 150B, as shown in FIG. 12. When a user touches the left-hand side of the touch-panel display 201, the video output apparatus 11 turns on the LED of the microphone 150A.

The video output apparatus 11 obtains video data including the video data obtained by photographing the first performer 13A, the video data obtained by photographing the second performer 13B, and the game image. In other words, in the third exemplary embodiment, the video output apparatus 11 receives first video data obtained by photographing a device (the microphone 150A or the microphone 150B) that performs the performance based on the user's operation. The video output apparatus 11 outputs output video data based on the first video data.

Thus, the video output apparatus 11 of the third exemplary embodiment displays a video image obtained by photographing the device (the microphone 150A or the microphone 150B), which performs the performance based on the user's operation, on the display 14. Therefore, a user can view a device that performs a performance according to a user's own operation, thereby making it possible to get a feel of participating in an event, so that a sense of unity with an event can be obtained.

Note that, by using the user terminal, each user may specify performer's device to be associated with the user himself/herself, in advance. In this case, even if a user touches any position of the touch-panel display, the specified device is turned on. For instance, when the user 31B specifies to be associated with the microphone 150A of the first performer 13A using the user terminal 51B, the video output apparatus 11 turns on the LED of the microphone 150A according to the user's operation in the user terminal 51B.

In this case, a user can light on a microphone of a user's favorite performer. Thus, a user can obtain a sense of unity with an event more.

Note that, the device that performs the performance based on the user's operation is not limited to an LED of a microphone. For instance, the video output apparatus 11 may turn on an LED of a game controller used by each performer. In this case, the game controller is also the device that performs the performance based on the user's operation.

Note that, also in the third exemplary embodiment, the camera may capture an image including content of game play currently being displayed on the display 14. In this case, the number of cameras may be one. Even if only one camera is provided, the video output apparatus 11 can obtain video data (the first video data) obtained by photographing the device that performs the performance based on the user's operation.

Note that, the video output apparatus 11 of the third exemplary embodiment may display the performance of the device in response to the user's operation and the performance image on the display 14. The video output apparatus 11 may display the performance of the device in response to the user's operation on the display 14, and furthermore may reproduce the performance sound. The video output apparatus 11 may display the performance of the device in response to the user's operation and the performance image on the display 14, and furthermore may reproduce the performance sound.

Further, when receiving the user's operation, the video output apparatus 11 may perform the performance with respect to all the devices, for example.

Fourth Exemplary Embodiment

Figure 13:
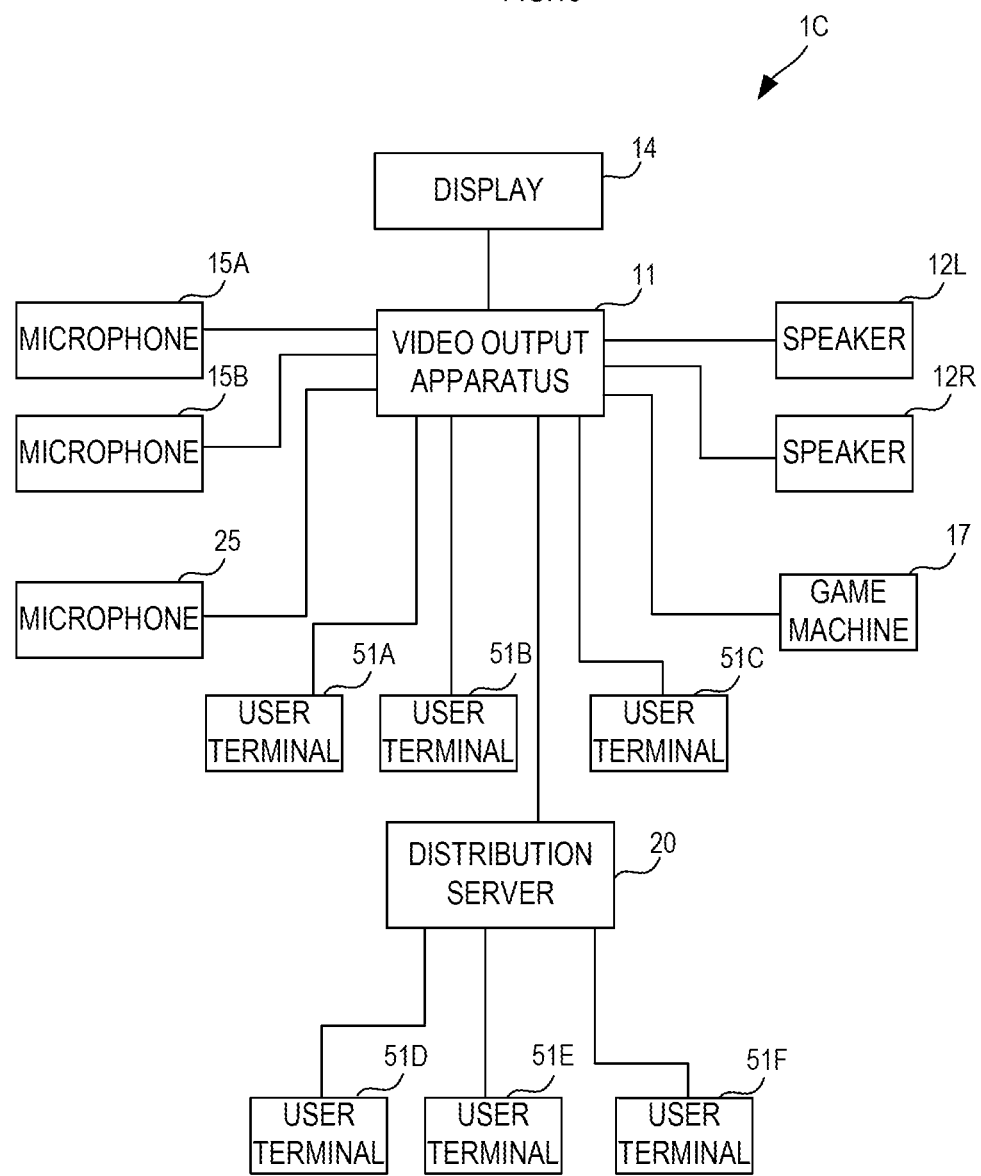
FIG. 13 is a block diagram showing a configuration of a video output system 1C in accordance with a fourth exemplary embodiment.

FIG. 13 is a block diagram showing a configuration of a video output system 1C in accordance with a fourth exemplary embodiment. The video output system 1C is further provided with a distribution server 20 and user terminals 51D to 51F. The other configuration is the same as in the video output system 1 of the first exemplary embodiment.

The distribution server 20 is connected to the video output apparatus 11 through the Internet. The video output apparatus 11 transmits output video data and sound data to the distribution server 20. The sound data includes sounds related to a sound of the game, a voice of the first performer 13A, a voice of the second performer 13B, and a voice of the emcee 21. The distribution server 20 receives the output video data and the sound data.

The user terminals 51D to 51F are connected to the distribution server 20 through the Internet. The user terminals 51D to 51F each are used for a corresponding one of different users located in different places. The user terminals 51D to 51F each have the same configuration and function as those of the user terminal 51A shown in FIG. 5.

The distribution server 20 transmits the output video data and the sound data to the user terminals 51D to 51F. Each of the user terminals 51D to 51F receives the output video data and the sound data from the distribution server 20 and reproduces them. Thus, each user of the user terminals 51D to 51F can view an event in a remote place.

The video output apparatus 11 receives user operation information from each of the user terminals 51D to 51F through the distribution server 20. The video output apparatus 11 generates a performance image and a performance sound based on the received user operation information. At this time, the video output apparatus 11 may change a display position of the performance image according to a touch position on the touch-panel display 201 in each of the user terminals 51D to 51F. Further, the video output apparatus 11 may change sound quality of the performance sound according to a touch position on the touch-panel display 201 in each of the user terminals 51D to 51F.

The video output apparatus 11 generates the output video data with which the performance image is synthesized. The video output apparatus 11 transmits the output video data with which the performance image is synthesized to the display 14 and the distribution server 20. Further, the video output apparatus 11 includes the performance sound in the sound data and transmits it to the distribution server 20.

Thus, the video output apparatus 11 reproduces the performance image and the performance sound according to an operation of the user located in a remote place. The performance image and the performance sound are also transmitted to the user terminals 51D to 51F in a remote place through the distribution server 20, and are reproduced. Note that, when the sound quality of the performance sound is changed, the user terminals 51D to 51F may perform panning processing and pitch change processing.

Thus, the user in a remote place can also reproduce the performance image and the performance sound according to the user's own operation, thereby making it possible to get a feel of participating in an event, so that a sense of unity with the event can be obtained.

The video output system 1C of the fourth exemplary embodiment shows an example in which the distribution server 20 and the user terminals MD to 51F in a remote place are combined with the video output system 1 of the first exemplary embodiment. However, the fourth exemplary embodiment may be combined with the second exemplary embodiment or the third exemplary embodiment.

The description of the present embodiments is illustrative in all respects and is not to be construed restrictively. The scope of the present invention is indicated by the appended claims rather than by the above-mentioned embodiments. Furthermore, the scope of the present invention is intended to include all modifications within the meaning and range equivalent to the scope of the claims.

The video output apparatus 11 may generate a plurality of performance images and a plurality of performance sounds simultaneously. However, if the number of performance sounds is increased, a user can hardly listen to each performance sound in a distinguishable manner. Therefore, an upper limit of the number of performance sounds is preferably less than an upper limit of the number of performance images.

What is claimed is:

1. A video output method comprising:
receiving a first operation from a first user among a plurality of users;
receiving a second operation from a second user among the plurality of users;
generating a first performance image based on the received first operation;
generating a second performance image based on the received second operation;
obtaining a plurality of performance sounds associated with the first and second performance images;
receiving video data;
synthesizing at least the video data, the first performance image, and the second performance image to generate synthesized output video data; and
outputting the synthesized output video data including a plurality of performance images including the first and second performance images,
wherein an upper limit of a number of the plurality of performance sounds is less than an upper limit of a number of the plurality of performance images.

2. The video output method according to claim 1, wherein:
the outputting outputs:
the first performance image at a first display location; and
the second performance image at a second display location,
the method further comprises changing either the first display position of the first performance image or the second display position of the second performance image in the synthesized output video data based on either the respective first or second operation, and
each of the first operation and the second operation is a touch operation to a respective touch panel display operated by the first or second user.

3. The video output method according to claim 2, wherein:
the received video data is first video data,
the method further comprises receiving second video data that includes a video image of a first performer and third video data that includes a video image of a second performer,
the synthesized output video data further includes the second video data and the third video data, and each of the first and second performance images is associated with either the first performer or the second performer.

4. The video output method according to claim 3, wherein each of the first and second performance images is associated with either the first or second performer based on the second video data and the third video data.

5. The video output method according to claim 2, wherein the first video data includes a video image obtained by photographing a performer.

6. The video output method according to claim 1, wherein:
the method further comprises:
generating first performance sound also based on the received first operation;
generating second performance sound also based on the received second operation; and
changing sound quality of the first or second performance sound based on the respective first or second operation,
each of the first operation and the second operation is a touch operation to a respective touch panel display operated by the first or second user, and provides position information for the respective first or second touch panel display, and
an amount of sound quality changing in each of the first and second performance sounds is associated with the respective position information of the first or second operation.

7. The video output method according to claim 6, wherein the sound quality includes pitch and panning.

8. A video output apparatus comprising:
at least one communication interface configured to receive:
a first operation from a first user among a plurality of users; and
a second operation from a second user among the plurality of users;
at least one data interface configured to receive and output data, the least one data interface receiving video data;
at least one processor configured to:
generate a first performance image based on the received first operation;
generate a second performance image based on the received second operation;
obtain a plurality of performance sounds associated with the first and second performance images;
synthesize at least the video data, the first performance image, and the second performance image to generate synthesized output video data;
outputting the synthesized output video data via the at least one data interface, the synthesized output vide data including a plurality of performance images including the first and second performance images,
wherein an upper limit of a number of the plurality of performance sounds is less than an upper limit of a number of the plurality of performance images.

9. The video output apparatus according to claim 8, wherein:
the at least one processor outputs:
the first performance image at a first display location; and
the second performance image at a second display location,
the at least one processor is further configured to change either the first display position of the first performance image or the second display position of the second performance image in the synthesized output video data based on either the respective first or second operation, and
each of the first operation and the second operation is a touch operation to a respective touch panel display operated by the first or second user.

10. The video output apparatus according to claim 9, wherein:
the received video data is first video data,
the at least one data interface further receives second video data that includes a video image of a first performer and third video data that includes a video image of a second performer,
the synthesized output video data further includes the second video data and the third video data, and
each of the first performance image and the second performance image is associated with either the first performer or the second performer.

11. The video output apparatus according to claim 10, wherein each of the first and second performance images is associated with either the first or second performer based on the second video data and the third video data.

12. The video output apparatus according to claim 9, wherein the first video data includes a video image obtained by photographing a performer.

13. The video output apparatus according to claim 8, wherein:
the at least one processor is further configured to:
generate first performance sound also based on the received first operation;
generate second performance sound also based on the received second operation; and
change sound quality of the first or second performance sound based on the respective first or second operation,
each of the first operation and the second operation is a touch operation to a respective touch panel display operated by the first or second user, and provides position information for the respective first or second touch panel display, and
an amount of sound quality changing in each of the first and second performance sounds is associated with the respective position information of the first or second operation.

14. The video output apparatus according to claim 13, wherein the sound quality includes pitch and panning.

* * * * *